United States Patent Office 3,642,631
Patented Feb. 15, 1972

3,642,631
SUBSTITUTED BITHIOPHENES
Henry Gisser and Seymour Portnoy, Philadelphia, Pa., assignors to the United States of America as represented by the Secretary of the Army
No Drawing. Division of application Ser. No. 8,386, Feb. 3, 1970. Continuation-in-part of application Ser. No. 690,403, Dec. 14, 1967. This application Nov. 24, 1970, Ser. No. 92,521
Int. Cl. C10m 1/30, 1/38
U.S. Cl. 252—48.4                3 Claims

ABSTRACT OF THE DISCLOSURE

A new heat-stable compound, 5,5'-diheptafluobutyryl-2,2'-bithiophene, and methods for its preparation which involves the use of ethyl bromide in an uncatalyzed Grignard coupling reaction, as well as methods for preparing other related bithiophenes having at least one substituent in each thiophene ring. Lubricating oils and hydraulic fluids containing this compound as a friction reducing agent are also described.

---

This invention may be manufactured, used, and licensed by or for the Government for governmental purposes without the payment to us of any royalty thereon.

This application is a division of our copending application, Ser. No. 8,386, filed Feb. 3, 1970, for "Substituted Bithiophenes," now abandoned, which is a continuation-in-part of our then pending application, Ser. No. 690,403, filed Dec. 14, 1967, for "Substituted Bithiophenes," now abandoned and related to bithiophenes, and more particularly concerns methods for preparing substituted bithiophenes in relatively good yield.

Substituted bithiophenes have been prepared in the past by the coupling of Grignard reagents in the presence of a cohalide catalyzed by means of cobaltous chloride, cupric chloride, or oxygen. Also, the reaction of thienylmagnesium halides and diethyl mesoxalate yielded substituted bithiophenes. The last-mentioned method involved a time-consuming multi-step synthesis. The methods utilizing metals or metal halide catalysts gave yields in the neighborhood of 10–15%, and in most cases, yields of 20% were the best obtainable. In addition, considerable time had to be expended in order to prepare the catalysts before use.

Due to the widespread military interests being currently generated in heat-stable components for use in lubricants, hydraulic fluids, and the like, and that substituted bithiophenes are known to be heat-stable, it would be most desirable if new methods could be developed for producing substituted bithiophenes in relatively good yield. More specifically, we have found that our compound, 5,5'-diheptafluorobutyryl-2,2'-bithiophene, finds utility as a friction reducing agent or additive in synthetic fluids, such as lubricating and hydraulic fluids, the additive being stable at elevated temperatures.

It is therefore, an object of this invention to provide substituted bithiophenes in relatively good yields.

Another object of the invention is to provide substituted bithiophenes having at least one substituent in each thiophene ring.

Still another object of the invention is to provide such bithiophenes in a one-step preparation and without resorting to the use of catalytic or metal coupling agents.

Yet another object of the invention is to provide a new composition of matter possessing the above desirable characteristics, and finding utility as a friction reducing additive in lubricating and hydraulic fluids.

Other objects and advantages of the invention will be obvious or will appear hereinafter in the following detailed description.

With the above objects in mind, our substituted bithiophene was prepared in accordance with the following generic process, each thiophene ring containing at least one substituent.

A dihalothiophene intermediate and magnesium turnings were reacted in ether and refluxed. After the mixture was cooled to room temperature, a cohalide was added and refluxing resumed.

The mixture was then filtered under nitrogen through glass wool and further reacted with another intermediate.

Examples of several bithiophenes which may be prepared by the aforedescribed generic process are as follows:

EXAMPLE I

Dihalo-2,2'-bithiophenes prepared from 2,3-, 2,4- or 2,5-dihalothiophenes.

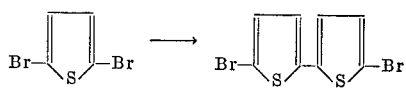

EXAMPLE II

Dihalo-3,3'-bithiophene prepared from 3,4-dihalothiophene.

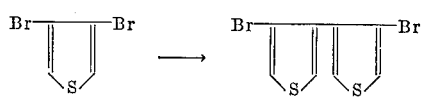

EXAMPLE III

Derivatives of 2,2'- and 3,3'-bithiophenes (Examples I and II) resulting from further reaction by the replacement of the halogen or halogens by other constituents.

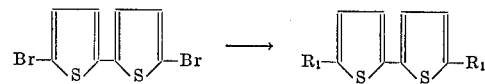

Where $R_1$=alkyl, aryl, acyl etc.

EXAMPLE IV

Derivatives of 2,2'- and 3,3'-bithiophenes (Examples I, II, and III) having one or more other substituents in the bithiophene ring resulting from the use of dihalothiophene intermediates having one or two other substituents.

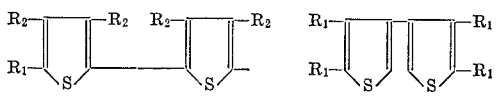

where:

$R_1$=alkyl, aryl, acyl, etc. and
$R_2$=alkyl, aryl, acyl, halogen, etc.

More specifically, our heat-stable, friction reducing additive new composition of matter, 5,5'-diheptafluorobutyryl-2,2'-bithiophene, may be prepared as follows:

The mono-Grignard was first prepared from 0.7 g.-atom of magnesium turnings and 0.1 mole of 2,5-dibromothiophene by the standard Grignard method. Iodine crystals and heat were found necessary to initiate the reaction. The mixture was refluxed for about 3 hours and cooled to room temperature. 0.5 mole of ethyl bromide in ether was added in about 1 hour. The ether solution of the Grignard compounds was refluxed for about 17 hours, filtered under nitrogen through glass wool (1.7 g. of magnesium recovered), and added over a 45 minute period to 0.7 mole of heptafluorobutyryl chloride in ether. The mixture was refluxed for ten hours and then added to a 10% ice-NH$_4$Cl solution. The separated ether layer was neutralized with 10% $K_2CO_3$ and finally dried over anhydrous $Na_2CO_4$. The ether was removed by distillation. Distillation under reduced pressure removed the liquid portion boiling from 28 to 113° C. (22 mm.) and left a tarry residue. Extraction of the residue with hot petroleum ether (boiling point 30–60° C.) gave an orange, crude product (a small quantity of the orange product crystallized on the condenser wall at 80° C. during distillation at reduced pressure). Crystallization from petroleum ether and recrystallization from heptane gave yellow platelets, M.P. 152.6–153.8° C., 26% yield.

Infrared bands (Nujol null) appeared at 3100 (w.), 1670 (vs.), 1510 (w.), 1440 (s.), 1360 m.), 1317 (m.), 1290 (m.), 1262 (m.), 1230 (s.), 1212 (s.), 1190 (m.), 1176 (m.), 1149 (m.), 1122 (vs.), 1088 (m.), 970 (w.), 940 (m.), 917 (vw.), 893 (w.), 828 (m.), 811 (m.), 754 (m.), and 733 (vw.-b.) cm.$^{-1}$.

*Analysis.*—Calculated for $C_{16}H_4F_{14}O_2S_2$ (percent): C, 34.42; H, 0.72; F, 47.64; S, 11.49. Found (percent): C, 34.29; H, 0.97; F, 47.32; S, 11.06.

The overall reactions are represented as follows:

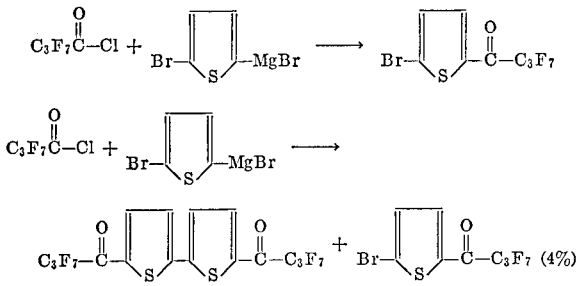

Data showing the improvement in friction reduction to a typical synthetic base fluid are presented below:

TABLE I.—ADDITIVE FOR REDUCING COEFFICIENT OF FRICTION (u) ON A SYNTHETIC BASE FLUID

| Additive | Weight, percent | Base fluid | u |
|---|---|---|---|
| None | | Bis(2-ethylhexyl) sebacate. | 0.22 |
| 5,5'-diheptafluorobutyryl-2,2'-bithiophene. | 0.5 | ____do____ | 0.19 |

The effective range of our additive compound falls between about 0.3 to 1.0 weight percent of the synthetic fluid which is not intended to be limited to sebacates or synthetic fluids.

Coefficient of friction was determined on a modified Bowden-Leben machine in which the tangential force was detected by strain gages mounted on a strain ring, the signals being amplified and recorded. The friction measurements were made with a ¼ in. diameter 440 C. stainless steel ball rider on an approximately 6 mm. thick plane 440 C. substrate. The steel substrate was prepared by rinsing in boiling benzene, polishing successively with 400, 600, 2/0, 3/0, and 4/0 silicon carbide paper and rinsing in boiling benzene. It was then placed in a desiccator over anhydrous calcium sulphate for 24 hours before use. These specimens also were stored over anhydrous calcium sulphate for 24 hours before use. All measurements were made at a 100 gram load and 0.04 cm./sec. sliding speed. The length of traverse was 1.3 to 1.9 cm. for each measurement. Three drops of our friction reducing solution were placed in a continuous line along the path to be traversed by the rider, the first drop being placed at a location so that it wet the rider. The area covered by the fluid was approximately 0.9 square centimeters. Friction measurements were started 5 to 10 seconds after applying our solutions. The standard deviation of the coefficient of friction measurement was 0.005.

We claim:
1. A new composition of matter comprising effective amounts of a member of the group consisting of lubricating oils and hydraulic fluids and friction reducing amounts of 5,5'-diheptafluorobutyryl-2,2'-bithiophene.
2. The composition of claim 1 wherein said base fluid is bis(2-ethylhexyl) sebacate.
3. The composition of claim 2 wherein said bithiophene is present in said sebacate in an amount ranging between about 0.3 to 1.0 weight percent.

References Cited
UNITED STATES PATENTS

| 2,620,344 | 12/1952 | Emerson | 252—48.2 X |
| 3,119,836 | 1/1964 | Krespan | 252—78 X |
| 3,395,101 | 7/1968 | Clark et al. | 252—45 X |

DANIEL E. WYMAN, Primary Examiner

W. H. CANNON, Assistant Examiner

U.S. Cl. X.R.

252—45, 48.8, 78